United States Patent [19]

Nutt

[11] Patent Number: 4,887,585

[45] Date of Patent: Dec. 19, 1989

[54] METHOD AND APPARATUS FOR CUTTING TAPS IN SEWER LINES

[76] Inventor: David H. Nutt, 1601 Somera Dr., Forest Grove, Oreg. 97116

[21] Appl. No.: 196,985

[22] Filed: May 20, 1988

[51] Int. Cl.⁴ .............................. B28D 1/04; B24B 7/00
[52] U.S. Cl. ........................................ 125/14; 51/23 R; 51/74 R; 51/290
[58] Field of Search .................. 125/14, 13 R, 12; 51/290, 74 R, 73 R, 110, 241 R, 241 S, 245; 175/92, 94, 100

[56] References Cited

U.S. PATENT DOCUMENTS

| | | | |
|---|---|---|---|
| 1,426,919 | 8/1922 | Sladden. | |
| 1,484,065 | 2/1924 | Gould | 175/94 |
| 2,351,169 | 6/1944 | Weinland | 51/20 |
| 3,171,150 | 3/1965 | Gray | 15/104.12 |
| 3,562,836 | 2/1971 | Frew et al. | 15/104.3 |
| 3,587,194 | 6/1971 | Brown | 51/241 |
| 3,740,785 | 6/1973 | Lafall | 15/104.12 |
| 3,750,339 | 8/1973 | Barnes | 51/290 |
| 3,844,362 | 10/1974 | Elbert et al. | 175/94 |
| 4,516,286 | 5/1985 | Crane | 15/104.09 |
| 4,657,449 | 4/1987 | Marich et al. | 409/143 |

Primary Examiner—Frederick R. Schmidt
Assistant Examiner—M. Rachuba
Attorney, Agent, or Firm—Marger & Johnson, Inc.

[57] ABSTRACT

A hydraulically-driven, self-propelled, in-line sewer tap cutter includes roller bearings mounted to the skids and extending beyond the outer edge of the skids to maintain the frame spaced apart from the sewer pipe and facilitate rolling locomotion of the cutter through the pipe. The roller bearings are positioned so as to align the frame with respect to the bit so that, in use, adequate bit clearance is maintained to cut off taps close to the sidewall of the pipe without jaming the bit at offsets. The specially sized bit includes an integral support shelf formed on the exterior of a generally cylindrical barrel to support cutting teeth mounted extending radially outside the barrel to improve bit life and prevent jamming the bit.

11 Claims, 2 Drawing Sheets

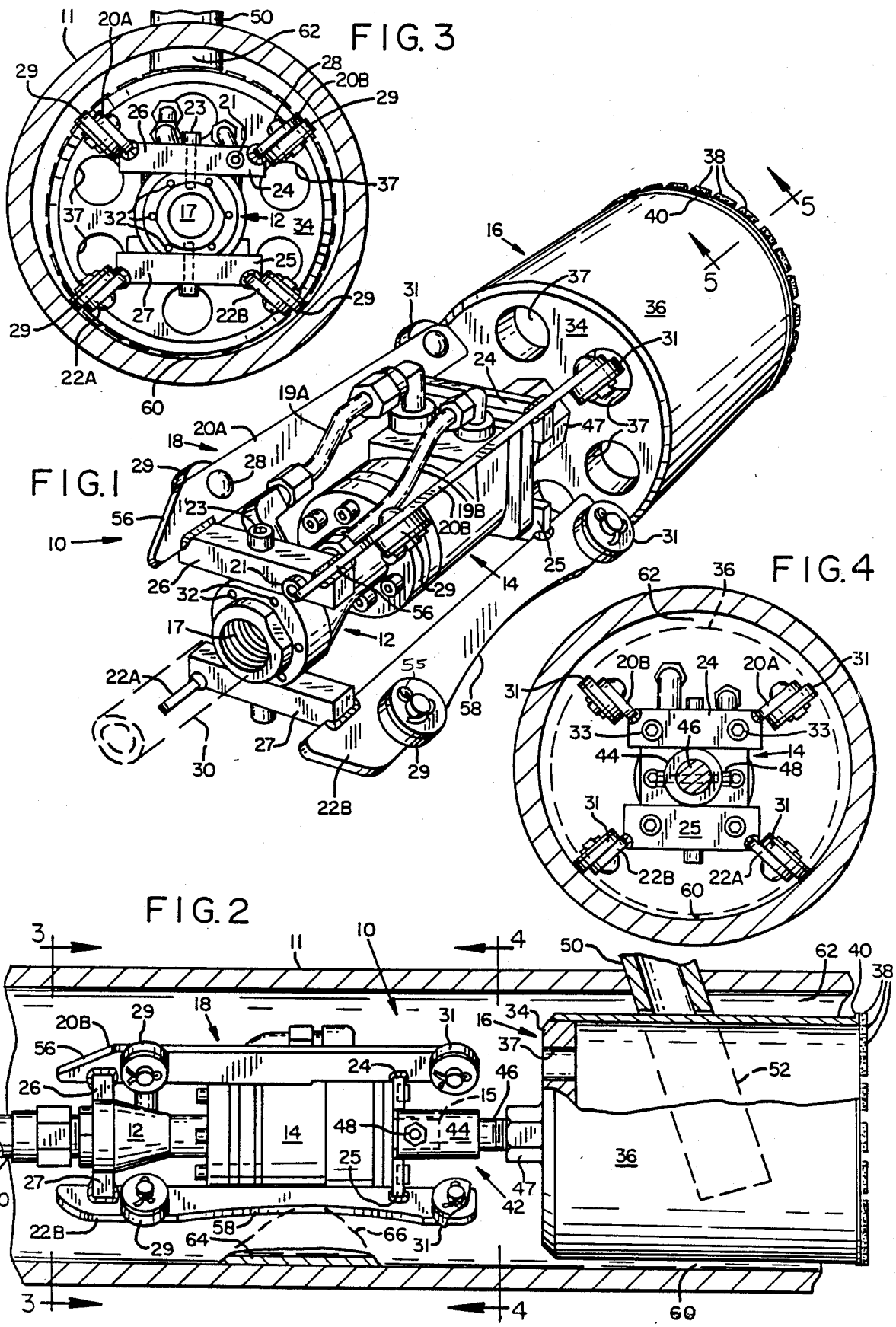

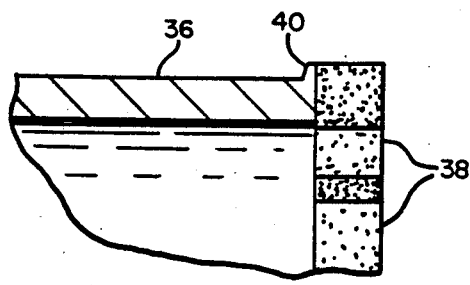
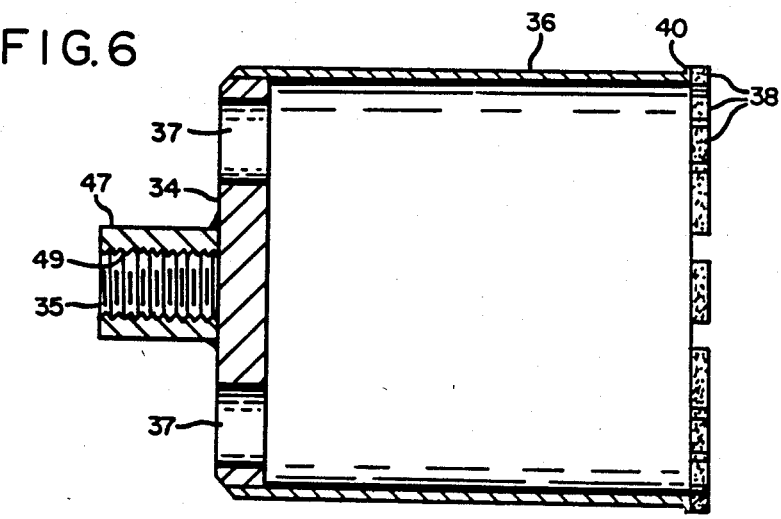
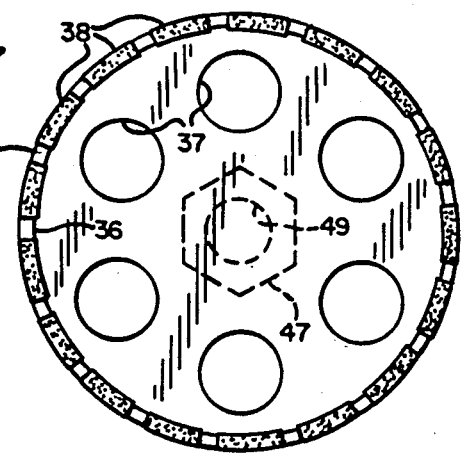

METHOD AND APPARATUS FOR CUTTING TAPS IN SEWER LINES

BACKGROUND OF THE INVENTION

This invention relates to in-line sewer pipe cleaners and, more particularly, to an improved, self-propelled, hydraulic in-line tap cutter.

Sewer mains or sewer pipes are placed along streets and highways below the surfaces thereof in virtually every city in the United States having a substantial population. Generally, access to sewer mains is gained by means of vertical conduits referred to as "manholes." Sewer pipes are commonly 6" or 8" in diameter with manholes spaced apart more or less at regular intervals of, say 400 feet.

Many modern building codes require that, when a sewer line from a residence or other building is tapped into the sewer main, the connection must be made according to certain prescribed standards with little or none of the tap line extending into the sewer main. Prior to the adoption of such codes however, tap connections sometimes were made which protrude substantially into the sewer pipe. Such tap connections (or simply "taps") were satisfactory for most purposes, but the protruding portions of such taps constitute a trap for leaves, roots, and other debris. When debris accumulates in a sewer pipe, it clogs or at least restricts flow in the sewer main. Metal fence posts and anchor stakes for pole support cables are sometimes driven through sewer pipes. These, too, form obstacles that lead to clogging, as do roots of trees which commonly intrude in sewer lines.

When sewer pipes become completely or substantially blocked, it of course interferes with the operation of the sewage system and the blockage must be cleared. One method of clearing such blockages is to dig a hole in the ground over the sewer pipe at the location of the obstruction, down to the level of the sewer pipe, break into the pipe, remove the debris, and replace the affected section with new pipe.

Cleaning a sewer pipe as described is extremely expensive due to the manpower and equipment required for such tasks and, therefore, is preferably avoided. Toward that end, devices have been proposed for cleaning sewer pipes by operating inside the sewer pipe to be cleared, hence the name "in-line" pipeline cleaner.

In-line pipeline cleaners that are known are generally acceptable for clearing leaves, tree roots, and other kinds of soft debris from a sewer pipe. Examples of such devices are shown in U.S. Pat. Nos. 3,740,785 to Latall; 4,516,286 to Crane; 3,844,362 to Albert; 3,562,836 to Frew and 1,426,919 to Sladen. Devices such as those shown in the aforementioned patents generally include some type of rotating bit or brush on the front end. In use, such cleaning devices are inserted into a sewer pipe at a manhole and are transported through the pipe to clean it and clear obstructions. The devices shown in those patents are not acceptable for cutting taps or other hard obstructions for several reasons explained below.

One of the important considerations in cutting taps is the need to propel the tap cutter through the pipe with a force sufficient to drive the rotating bit through the intruding tap to cut it. Adequate force may be provided manually by pulling the tap cutter through the pipeline using a cable. Examples of tap cutters designed to be dragged through the pipe by a cable are shown in U.S. Pat. Nos. 3,587,194 to Brown and 4,657,449 to Marich et al. Those machines are expensive to use because their operation requires a two-person crew; a first person positioned at one manhole upstream of the tap cutter to pull it through the pipe, and a second person positioned at a downstream manhole to operate the hydraulic or other fluid lines provided to operate the tap cutter and control the necessary pump.

Labor expense can be reduced substantially by employing a self-propelled tap-cutting apparatus that can be operated by one person. An example of a self-propelled apparatus for clearing soft materials is shown in U.S. Pat. No. 4,516,286, mentioned above. That apparatus, however, is designed for cleaning away roots and other soft debris but is not adequate to cut taps. A suitable cutting bit is not disclosed in the in-line sewer pipe cleaning art. Additionally, even with an appropriate tap cutting bit, the apparatus shown in U.S. Pat. No. 4,516,286 would be ineffective for cutting taps over a sufficiently long distance to reach between manholes, for example, 400 feet. Drag due to the skids provided on that apparatus (reference numeral 14) would leave inadequate forward force to cut a tap.

An important object in tap cutting is to cut off the tap as close as possible to the sewer pipe interior wall, to minimize the accumulation of debris behind (i.e. upstream of) the tap. U.S. Pat. No. 4,657,449 shows an apparatus directed to cutting a tap close to the sewer pipe wall. That apparatus employs a relatively small cutting bit, radially positionable about the longitudinal axis of the apparatus. Such an arrangement would not work for cutting large taps. For example, it is not uncommon to encounter taps which are only slightly smaller than the sewer pipe into which they feed, for example, a 6" tap in an 8" line. In that circumstance, an apparatus of the type shown in '449 simply would jam up and stop, or perhaps damage itself.

An approach useful for cutting larger taps is to employ a cutting head or bit having a diameter only slightly less than the diameter of the sewer pipe in which the tap cutting apparatus is to be used. A tap cutting apparatus of that sort is shown in U.S. Pat. No. 3,587,194 to Brown. That apparatus, however, and others like it, are inclined to hang up or become stuck at offsets in the sewer pipeline due to its length. It also requires two people to use it, and its design is very complex.

Another problem encountered in clearing taps from sewer pipes is breakage of the sewer pipe. Excessive jarring, shaking and knocking against the pipe is likely to break the pipe, particularly an older pipe made of concrete aggregate. Another problem which results from attempts to cut a tap involving undue shaking and jarring is breaking or cracking the tap at a position outside of the sewer main. Either of these circumstances requires digging up the pipeline to repair the pipe, thereby nullifying the advantages of using an in-line tap cutting device. For example, the apparatus shown in U.S. Pat. No. 3,562,836 to Frew et al. appears likely to cause such damage in the event it encounters a protruding pipe connection, because of its blunt reaming head.

Accordingly, it is an object of the present invention to provide a method and an in-line tap cutting apparatus that are effective for clearing taps and other hard obstructions from sewer lines.

A second object of the present invention is to provide a self-propelled tap cutter capable of operating effectively at a substantial distance from a pressurized water source.

Another object of the present invention is to enable a single worker to clear taps from a sewer pipe, operating an in-line tap cutter over substantial distance, with minimal risk of jamming.

A further object of the present invention is to cut away a tap of a diameter up to approaching that of the sewer pipe without breaking the sewer pipe or cracking the tap outside the sewer pipe.

Another object of the present invention is to enable an in-line tap cutter to travel through a sewer pipe and cut taps close to the interior wall of a sewer pipe without jamming at offsets in the pipe.

SUMMARY OF THE INVENTION

A tap cutter according t the present invention includes a frame formed of four rigid, flat elongate steel skids, radially arranged and equiangularly spaced about a hydraulic motor and jet thruster. The skids are tapered inwardly at both ends to avoid snagging on irregularities in the pipe. Forward and rearward rollers are provided on each skid, extending outward from the outside edge of the skid to maintain the skid spaced apart from the interior surface of the sewer pipe and to minimize drag of the tap cutter in the pipe. A generally cylindrical bit is mounted to the output shaft of the motor. The outside edges of the skids define an outside periphery of the frame sized smaller than the outside diameter of the bit.

The bit includes a circular base plate having a threaded central aperture for removably mounting the bit to the shaft. The base plate includes a plurality of apertures to allow water to flow through the base plate so it does not back up upstream of the tap cutter. A substantially cylindrical barrel fits over the base plate and is welded in place. The barrel is radially enlarged near the top edge to form an integral support shelf for supporting a plurality of diamond-impregnated cutting teeth in position such that they extend radially beyond the periphery of the barrel. The barrel is sized such that its interior length is greater than the outside diameter of the barrel for cutting taps having outside diameter up to approaching the inside diameter of the pipe.

Methods of remotely cutting a tap protruding into a pipe includes controlling the fluid pressure provided to the tap cutter to propel it slowly up the pipe toward the tap and, when the tap is reached, increasing the pressure significantly. The methods further include sizing the bit to a diameter in the range of ½ to 1½ inches less than the inside diameter of the pipe.

The foregoing and other objects, features and advantages of the invention will become more readily apparent from the following detailed description of a preferred embodiment which proceeds with reference to the drawings.

DESCRIPTION OF THE DRAWINGS

FIG. 1 is a rear perspective view of a tap cutter according to the present invention, showing a high pressure water supply hose in phantom.

FIG. 2 is a side elevation view of the tap cutter of FIG. 1 positioned in a sewer pipe, showing the pipe in lengthwise section and the cutting bit partially cut away to show detail of the bit in use.

FIG. 3 is a rear elevational view of the tap cutter taken along line 3—3 of FIG. 2.

FIG. 4 is a cross-sectional view of the tap cutter taken along line 4—4 of FIG. 2.

FIG. 5 is an enlarged fragmentary sectional view of the cutting bit taken along line 5—5 of FIG. 1.

FIG. 6 is a lengthwise sectional view of the tap cutting bit of FIG. 1.

FIG. 7 is a front elevational view of the tap cutting bit showing the base plate connector nut in phantom.

DETAILED DESCRIPTION OF THE PREFERRED EMBODIMENT

Referring to FIG. 1, an in-line tap cutter 10 according to the present invention generally includes a frame 18, a hydraulic motor 14 mounted within a forward portion of the frame, and a water jet thruster 12 mounted within a rearward portion of the frame 18. The motor 14 has an output shaft 15 shown in FIG. 2 in phantom. A bit 16 is mounted to the output shaft of the motor 14. The location of the bit 16 defines the forward end of the tap cutter.

The jet thruster 12 includes a threaded female connector with an inlet passageway 17 directed toward the back end of the tap cutter 10 and adapted to receive a threaded male end of an inlet hose 30, shown in phantom in FIG. 1. The other end of the hose 30 (not shown) is connected to an adjustable source of fluid, for example water, which is under high pressure (e.g. up to 2000 psi) to operate the tap cutter. The jet thruster 12 propels the tap cutter through a pipe by expelling a portion of the pressurized fluid out of a plurality of rearward and outward-angled propulsion ports, collectively labelled 32.

Another portion of the pressurized fluid is directed from the jet thruster 12 through inlet conduit 19A to the hydraulic motor 14. The fluid pressure in conduit 19A drives the motor to rotate the output shaft 15 (FIG. 2) and bit 16. After circulation through the motor, the fluid is directed back toward the rear of the tap cutter through exhaust tube 19B. The fluid is expelled through a rearward directed discharge port 21 to assist in propelling the tap cutter forward through the pipe to be cleared.

Referring now to FIGS. 1–4, the frame 18 includes four generally flat, elongate rigid skids, 20A and 20B (the upper skids) and 22A and 22B (the lower skids). The skids are substantially radially arranged and spaced equiangularly apart about the motor and the jet thruster. The skids preferably are made of steel to provide substantial strength and weight. Each skid is rounded at the outside corner of the front end, as shown in FIG. 2 where lower roller 31 is cut away. The upper skids 20A and 20B are tapered or angled along the outside edge from a point adjacent the roller 29 to the back end of the skid thereby forming a slanted edge 56. This arrangement avoids jamming the tap cutter in a pipe while the cutter is being backed out of the pipe. The lower skids 22A and 22B also are tapered at the back end. The lower skids are hollowed out along the outside edge to form concave edge 58. This feature improves the cutters ability to travel over offsets and intruding seams in the pipe.

The upper skids 20A and 20B are welded to cross brace 24 near the front end of the frame and welded to cross brace 26 near the back end of the frame. Similarly, lower skids 22A and 22B are welded to a cross brace 25 near the front end of the frame and welded to cross brace 27 near the back end of the frame. The front cross braces 24 and 25 are bolted to the hydraulic motor 14, for example by bolts 33, best seen in FIG. 4. The rear cross braces 26 and 27 are bolted to the jet thruster 12. Finally, the jet thruster 12 is bolted to the hydraulic motor 14. Thus, the frame, motor and jet thruster together form a rigid unitary structure. The outside edges of the four skids define an outside periphery of the frame. The frame is sized so that its outside periphery defines a circle only slightly smaller in diameter, e.g. ¼ inch, than the diameter of the bit 16.

A pair of wheels or rollers is mounted on each of the skids as shown in FIGS. 1 and 2. The rearward rollers are identified by numeral 29 and the forward rollers by numeral 31. The rollers space the skids apart from the interior surface of the pipe to be cleared, as illustrated in FIGS. 3 and 4. The rollers are sized (e.g. 1½ diameter) and positioned so that only a small arc of the roller circumference protrudes outward (e.g. ¼") from the edge of the skid. This helps the rollers pass easily over offsets in the pipe while deflecting the bit 16 only slightly so that it doe not strike the interior surface of the pipe. The rollers are mounted on the skids to prevent the frame from rotating within the pipe. Referring now to FIGS. 3 and 4, the rollers on the lower skids 22A and 22B ride on the interior surface of the pipe 11 under the tap cutter when it is in use. The rollers on the upper skids 20A and 20B are provided to ensure that drag occasioned by frictional contact with the interior surface of the pipe 11 is minimized even in the event of the tap cutter 10 becomes inverted in use. Additionally, the upper rollers help to ensure smooth travel over irregularities and offsets in the pipe.

To mount each roller, a bolt or pin, for example bolt 28 in FIG. 1, is inserted through a hole in the skid sized to receive it. A roller is slidably engaged over the bolt from the side of the skid opposite the bolt head. A washer is next positioned on the bolt on top of the roller bearing. Finally, the bolt is cut, if necessary, to an appropriate length, and drilled to receive a retaining pin such as cotter pin 55. Preferably, the rollers are made with sealed bearings because of the intended use in a dirty and wet environment.

Referring now to FIG. 2, a side view of the tap cutter 10 in use, a portion of roller 31 is cut away to reveal its positioning relative to the front end of the skid 22B. The front, outside corner of the skid is rounded and the roller 31 is positioned so that its periphery extends slightly outward and beyond the contour of the skid. The same positioning applies to all four rollers positioned adjacent the front ends of the skids. This arrangement enables the tap cutter to travel over a variety of irregularities and offsets in a pipe without jamming or becoming stuck, because the part that contacts the offset or obstruction is the periphery of the roller which is free to rotate.

The four rearward rollers, such as roller 29, similarly are mounted so that they extend radially beyond the outside edge of the respective skid so that they maintain the skid spaced apart from the interior surface of the pipe. Thus, the tap cutter frame 18 generally does not contact the interior surface of the pipe. Only the rollers contact the pipe. As the rollers are free to rotate, drag associated with moving the tap cutter through a pipe is negligible. Only the hose 30 drags due to frictional engagement with the interior surface of the pipe.

Referring now to FIG. 2, a connector 42 is provided for removably connecting the bit 16 to the output shaft 15 of the hydraulic motor 14. The connector 42 includes a generally cylindrical sleeve portion 44 and a solid, externally-threaded post 46. The sleeve portion 44 is sized to fit over the shaft 15. The sleeve is retained in place by a retaining pin or bolt 48 which passes through a pair of holes in the sleeve 44 and a hole through the shaft 15 provided for that purpose. The post 46 is sized and threaded to threadably engage with the base plate 34 of the bit 16, described below. The base plate includes a connector nut 47 defining a central aperture 35. The aperture 35 includes internal threads 49 sized to threadably engage the post 46 described above.

Referring now to FIGS. 5, 6, and 7, the bit 16 includes a base plate 34, a substantially cylindrical barrel 36 welded to the base plate, and a cutting edge formed of teeth 38 positioned along the top edge of the barrel 36.

The base plate 34 has a generally circular outline, sized to fit snugly into the bottom end of the barrel 36, where it is welded in place. The base plate has a plurality of apertures 37 for allowing fluid in the pipe being cleared to flow by the tap cutter by passing through such apertures. These apertures avoid accumulation of water in front of, i.e. upstream of, the bit. Such an accumulation would impede the forward progress of the tap cutter.

A connecting nut 47 is welded to the center to the exposed side of the base plate 34. The connecting nut 47 defines a central aperture 35. The aperture 35 has interior threads 49 sized to threadably engage the connector 42, described above, for mounting the bit to the hydraulic motor.

The barrel is made of steel and has no seam. It is formed by turning (on a lathe) an initially straight, cylindrical barrel, which has a wall thickness and outside diameter greater that the desired barrel, so as to remove material from the exterior surface except for a portion adjacent the top end of the barrel. The barrel is tapered outward near the top end to form integral support shelf 40.

The cutting edge includes a plurality of teeth 38, soldered to the top edge of the barrel 36. The teeth are sized and positioned so that each tooth extends radially slightly inwardly of the top edge of the barrel and radially outwardly coincident with the underlying support shelf 40. The teeth are formed of a diamond-impregnated soft steel matrix as is known for example in concrete core cutting. Positioning the cutting teeth as described provides for cutting a path slightly larger than the outside diameter of the barrel 36 below the shelf so that the barrel does not become stuck or jammed in the pipe. This arrangement also increases the useful life of the bit as it wears predominantly radially from the outside surface of the teeth.

Sizing of the bit is important in several respects. The bit must be small enough in diameter to pass through the pipe without jamming, including passing over offsets where two pipes are joined. On the other hand, the bit must be large enough to cut off the tap fairly close to the interior surface of the pipe. It must also be sized with a diameter which is somewhat larger than the diameter of the frame 18, yet not so large as to eclipse the roller bearings. These parts should be arranged so that the roller bearings maintain both the frame and the bit spaced apart from the interior surface of the pipe. This relationship is illustrated in the end views of FIGS. 4 and 5. In FIG. 4, the outline of the bit 16 is shown in phantom by dashed line 36. It may be observed here that the bit is larger than the periphery of the frame defined by the skids, and smaller than the diameter defined by the outside edges of the roller bearings.

The length of the barrel 36 must be selected so that the interior length of the bit is greater than the diameter of the largest tap expected to be encountered. In practice, taps sometimes are encountered which are sized only slightly smaller than the sewer pipe into which they protrude. For example, a six-inch tap may be found protruding into an eight-inch sewer line. In that circumstance, if the length of the interior of the cutting bit is less than six inches, the diameter of the tap, the tap cutter will be unable to cut completely through the tap. At the same time, the overall length of the tap cutter, including the bit, should be minimized so that the tap cutter can be lowered down a manhole and positioned into a sewer pipe without removing the bit or otherwise disassembling the apparatus.

Each tap cutter is aligned and balanced during manufacturing as follows. Prior to drilling the holes in the skids for mounting the four rearward roller bearings, the tap cutter is otherwise completely assembled with the bit mounted thereon. The assembled tap cutter is positioned in a test length of pipe having an inside diameter about 1 inch greater than the periphery of the frame defined by the outside edges of the skids, and having a length approximately equal to the overall length of the tap cutter.

The position of the apparatus is then adjusted in the test pipe by inserting shims in lieu of the two lower, rearward rollers. The shims have a thickness approximately the same as the distance that the rollers will extend beyond the skid edge when they are installed. The shims are positioned axially along the skid such that the cutting teeth are spaced about $\frac{1}{2}$ inch below the upper interior surface of the test pipe, and spaced about $\frac{1}{8}$ to $\frac{1}{4}$ inch above the lower interior surface of the test pipe. This greater clearance from the top of the pipe is provided so that, if and when the forward rollers encounter an offset in the pipe and ride up on it, the cutting edge of the bit will not scrape or jam on the top of the pipe. The positions of the shims is marked on the skids, for example by paint. The tap cutter is removed from the test pipe, and holes for mounting the rollers are drilled in the skids positioned as indicated by the marks.

The weight distribution and balance of each finished tap cutter is tested as follows. The tap cutter is positioned on a substantially flat underlying surface A test force is applied to the exterior of the bit at the top end, i.e, adjacent the cutting teeth, in a generally downward direction. The apparatus should remain position with all four lower rollers in contact with the underlying surface under a test force of at least about 2 pounds. Where a relatively small diameter cutting is used, the smaller bit includes a thicker base plate 34 to add to the mass of the bit, so that the overall apparatus is properly balanced.

In an example of a tap cutter operative for cutting a tap from an 8" pipe according to the present invention, the tap cutter is about 22$\frac{1}{2}$" long including the bit. The skids are made of steel, each measuring about 13" long overall, 1$\frac{1}{2}$" wide and $\frac{3}{8}$" thick. The frame measures approximately 3$\frac{1}{4}$" between the bottom skids at their closest point and approximately 5$\frac{1}{4}$ between the outer edges of the bottom skids. The skids are positioned along radii spaced approximately 45° apart about the motor and jet thruster. The rollers are sealed bearings made by Delco (division of General Motors), Model 77503-NDH, positioned approximately 8$\frac{1}{2}$" between centers along each skid and extending approximately $\frac{1}{4}$" beyond the outside edge of the skid.

The jet thruster in the example is a Model 130460 nozzle made by Aquatech of Cleveland, Ohio. Its inlet passage accepts a 1" hose. The hydraulic motor is an H-series motor made by Eaton Corporation of Eden Prairie, Minn. The connector on the output shaft has a sleeve portion about 2$\frac{1}{2}$" long.

The bit in the example may be 7" or 7$\frac{1}{2}$" in diameter overall, including the support shelf. The barrel is about $\frac{3}{8}$" thick at the shelf, and approximately 7$\frac{1}{4}$" long overall. The base plate is about 1" thick, and has six apertures for water flow, each about $\frac{1}{2}$" in diameter. The cutting teeth, 16 in number, are made to order by Diamond Products, Elyria, Ohio. They are cast of a diamond-impregnated soft steel matrix, and measure about 1" long, $\frac{3}{8}$" wide and $\frac{3}{8}$" tall. The teeth are curved at a radius equal to the outside radius of the bit, as illustrated in FIG. 7 in the drawing. The total weight of the tap cutter is about 47 pounds.

OPERATION OF THE TAP CUTTER

Clearing a tap from a sewer pipe in accordance with the present invention proceeds as follows. First, a tap cutter must be used which is sized appropriately with respect to the sewer pipe to be cleared. Referring now to FIGS. 3 and 4, the tap cutter has a bit diameter at least $\frac{1}{2}$" less than the inside diameter of the pipe to be cleared, and preferably about 1" less than said diameter, but not much smaller. This sizing of the bit provides for clearance 62 above the bit in the pipe 11, and clearance 60 below the bit.

The position of a tap or other obstruction in a sewer pipe often is determined by the use of a video camera. A video camera may be mounted on the tap cutter described herein by the use of a swivel mount that attaches to the base plate inside the cutting bit. If the distance to the tap is known, the hose supplying the tap cutter is laid out on the ground and marked at the corresponding position on the hose, so that the operator will know when the tap cutter reaches the tap.

Assuming that at least the approximate location of an obstruction or tap has been identified, the tap cutter is placed into the sewer pipe at the nearest access point downstream of the offending tap. The hose is connected to the inlet port 17 to provide a pressurized source of water. Typically, a truck equipped with a pump and retractable reel of hose is provided near the point of access to the sewer pipe to supply the tap cutter. The pump should be capable of delivering water at pressure up to approximately 2000 psi. The hose is connected at both ends and the tap cutter positioned in the pipe. The operator turns on the water source and increases the pressure only modestly, such that the tap cutter begins to move forward without manual assistance. As the tap cutter proceeds up the sewer pipe the drag of the hose increases, and the water pressure must be gradually increased to maintain forward progress of the tap cutter. During this step, forward velocity is controlled to keep from irretrievably jamming the cutter if an obstacle, e.g. a joint, is encountered. Forward velocity should not exceed about 400 feet per minute and is preferably about 200 feet per minute, normally attained at 400–600 psi in the operative example described above.

At the point where the tap cutter bit counters the tap, the tap cutter stops its forward travel because the fluid pressure is inadequate for cutting the tap. At that point, the operator increases the fluid pressure substantially, typically to a pressure of about 1000–1400 psi. The additional water pressure increases both the forward drive of the tap cutter against the tap and the rotational speed of the bit. Using the tap cutter described above as an operative example, the cutting time through a 4" tap is under four minutes for a concrete tap; under five minutes for a cast iron tap; and, about a minute or two for a PVC tap.

An experienced operator can determine that the tap cutter is cutting a tap, and when the cut is complete, by feeling the vibrations in the hose. After the cut is complete, the tap cutter is withdrawn from the pipe by pulling on the hose. While the cutter is being withdrawn, the water pressure is reduced, but the water supply is not completely turned off, so that debris is flushed out of the pipe by the water emitted from the propulsion ports and the discharge port as the tap cutter is pulled out of the pipe.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A tap cutter for clearing a pipe comprising:
 a frame defining a front end and a back end;
 a hydraulic motor having a shaft mounted within the frame adjacent the front end;
 a hydraulic jet thruster connected within the frame adjacent the back end of the frame for propelling the tap cutter through the pipe;
 a bit removably connected to the shaft; and
 roller means connected to the frame for maintaining the frame spaced apart from the interior surface of the pipe; the roller means being mounted on and aligned with the frame so as to prevent the frame from rotating within the pipe.

2. A tap cutter according to claim 1 in which:
 the frame includes a plurality of elongate skids, each having inside and outside lengthwise edges, positioned substantially equiangularly spaced apart about the motor and the jet thruster such that the outside edges of the skids define an outside periphery of the frame sized smaller than the outside diameter of the bit; and
 the roller means are rotatably connected to at least two of the skids.

3. A tap cutter according to claim 2 wherein the roller means include a roller aligned with the skids so as to rotate as the cutter moves longitudinally through the pipe and positioned to extend radially beyond the outside edge of each skid so that the rollers maintain the skids spaced apart from the interior surface of the pipe.

4. A tap cutter according to claim 2 wherein the roller means include:
 forward and rearward roller bearings spaced apart along each skid and extending beyond the outside edge of the skid for contacting and rolling over irregularities on the inside surface of the pipe, the forward roller bearing extending beyond the front end of the skid; and further including
 a bolt for mounting each roller bearing, the bolt fixed to the skid extending through a respective hole in the skid sized to receive it;
 each of the roller bearings being connected to the skid by slidable engagement onto a respective one of the bolts to maintain the roller bearing in alignment with the skid so that the bearings roll to facilitate longitudinal movement of the cutter in the pipe.

5. A tap cutter according to claim 2 wherein the bit includes:
 a base plate having means for mounting the bit onto the shaft and means defining a plurality of apertures to allow fluid to pass through the base plate;
 a substantially cylindrical barrel having a top edge and a bottom end, fixed along the bottom end to the base plate; and
 a plurality of cutting teeth rigidly fixed to the barrel positioned spaced apart along the top edge of the barrel and extending radially outside the periphery of the barrel.

6. A tap cutter according to claim 5 wherein:
 the barrel includes an integral support shelf extending radially outward along the top edge of the barrel for supporting said teeth.

7. A tap cutter according to claim 5 wherein the rearward roller bearings are positioned so as to align the frame relative to the bit so that the tap cutter is operable to cut off a tap close to the inside surface of the pipe without jamming.

8. A tap cutter according to claim 5 in which the interior length of the barrel is greater than the outside diameter of the barrel.

9. A tap cutter according to claim 4 wherein said motor, bit, frame, roller bearings and jet thruster are sized and positioned relative to one another so that the gravitational center of the tap cutter is positioned between the forward roller bearings and the rearward roller bearings to stabilize the tap cutter.

10. A tap cutter according to claim 5 in which each skid is tapered along a portion of the outside edge adjacent the back end of the skid.

11. A method of clearing a tap in a sewer line, comprising the steps of:
 providing a self-propelled, hydraulic in-line tap cutter including a rotatable cutting bit, an elongate frame and upper and lower rollers connected to the frame for maintaining the frame spaced apart from the interior surface of the sewer line;
 connecting a flexible hose to the tap cutter;
 providing fluid under variable pressure to the hose;
 positioning the tap cutter in the line downstream of the tap such that the cutter is aligned with the sewer line;
 orienting the cutter in the line such that the cutter rests on the lower rollers;
 controlling the fluid pressure to roll the tap cutter longitudinally through the pipe on the lower rollers toward the tap at a predetermined velocity until the tap cutter reaches the tap;
 increasing the fluid pressure to provide additional forward propulsion and to increase rotational speed of the bit for cutting the tap until the tap is cut; and
 preventing the frame from rotating within the pipe while the cutter travels through the line and cuts the tap.

* * * * *

UNITED STATES PATENT AND TRADEMARK OFFICE
CERTIFICATE OF CORRECTION

PATENT NO. : 4,887,585

DATED : December 19, 1989

INVENTOR(S) : David H. Nutt

It is certified that error appears in the above-identified patent and that said Letters Patent is hereby corrected as shown below:

Cover page,     References Cited, seventh patent cited, change "Lafall" to --Latall--;

ABSTRACT, line 9, change "jaming" to --jamming--;

Column 3,     line 17, change "t" to --to--;

line 58, before "DESCRIPTION" insert --BRIEF--;

Column 7,     line 47, insert a period after "surface";

line 63, change "5 1/4" to --5 1/4"--;

Column 8,     line 17, change "3/8" wide" to --1/4" wide--.

Signed and Sealed this

Thirtieth Day of July, 1991

Attest:

HARRY F. MANBECK, JR.

*Attesting Officer*     *Commissioner of Patents and Trademarks*